United States Patent [19]

Hamalainen et al.

[11] Patent Number: 4,500,930
[45] Date of Patent: Feb. 19, 1985

[54] TELEVISION SIGNAL STANDARDS CONVERSION USING A HELICAL SCAN VTR

[75] Inventors: Kaarlo J. Hamalainen, Marlton; Glenn A. Reitmeier, Trenton, both of N.J.

[73] Assignee: RCA Corporation, New York, N.Y.

[21] Appl. No.: 382,198

[22] Filed: May 26, 1982

[51] Int. Cl.³ .............................................. H04N 9/491
[52] U.S. Cl. ..................................... 358/310; 358/11; 358/324
[58] Field of Search ................. 358/324, 11, 140, 335, 358/338, 310

[56] References Cited

U.S. PATENT DOCUMENTS

4,283,736  8/1981  Morio et al. .......................... 358/11
4,346,397  8/1982  Ota ......................................... 358/4

Primary Examiner—Richard Murray
Attorney, Agent, or Firm—E. M. Whitacre; W. H. Meise; H. I. Steckler

[57] ABSTRACT

A television standards converter uses a VTR. The capstan speed is that of the video signal recorded on the tape, however, the drum speed is that of the standard to which it is desired to convert. Thus the reproduced signal has the original line rate but the new field rate. A line rate converter converts the reproduced signal to the new line rate, the signal is now totally in the new standard.

2 Claims, 8 Drawing Figures

Fig. 3 
— LINE OF THE 525 PICTURE
--- LINE OF THE 625 PICTURE

Fig. 4
— LINE OF THE 525 PICTURE
--- LINE OF THE 625 PICTURE

Fig. 5

| Recurring sequence of new raster scan lines | Binary output condition of counter 84 | | | Interpolation coefficient $\Delta_n$ | Binary address input condition of ROM 70 | | Binary condition of switch bank 76 | Binary condition of switch bank 78 |
|---|---|---|---|---|---|---|---|---|
| | $C_1$ | $C_2$ | $C_3$ | | $A_1$ | $A_2$ | | |
| 0 | 0 | 0 | 0 | 0 | X | X | 0 | 0 |
| 1 | 0 | 0 | 1 | 5/6 | 0 | 0 | 0 | 1 |
| 2 | 0 | 1 | 0 | 4/6 | 0 | 1 | 0 | 1 |
| 3 | 0 | 1 | 1 | 3/6 | X | X | 1 | 1 |
| 4 | 1 | 0 | 0 | 2/6 | 1 | 0 | 0 | 1 |
| 5 | 1 | 0 | 1 | 1/6 | 1 | 1 | 0 | 1 |

TELEVISION SIGNAL STANDARDS CONVERSION USING A HELICAL SCAN VTR

BACKGROUND OF THE INVENTION

There are many different signal standards used for television broadcasting in various countries. For example, the frame frequency is 30 Hz in the United States and Japan, and 25 Hz in England and Continental Europe. The number of horizontal lines per frame is 525 in the United States and Japan, and 625 in Europe and many other countries. Therefore, when a prerecorded television program is exchanged between such countries which have different frame and/or line frequency standards, a frequency conversion must be provided. Various schemes have been devised in the prior art for converting between the field or frame rates and the line rates of the various television signal standards. However, these schemes require multiple frame stores and sophisticated signal processing hardware to achieve the conversion because of the differences in horizontal, vertical, and frame rates. Such "standards converters" are extremely expensive.

It is therefore desirable to provide a less expensive means of converting the standard of a prerecorded television signal to that of another standard.

SUMMARY OF THE INVENTION

A helical scan video tape recorder, having a capstan that determines the velocity at which the tape travels and at least one video head disposed on a drum which rotates at a velocity to scan the video heads across the direction of tape travel, is arranged to convert from the frame rate of the recorded video to the desired replay frame rate. A control means is provided for establishing the speed of the capstan in accordance with the signal standard of recorded video on the tape and for establishing the drum speed in accordance with the desired replay standard. Adjustment of the horizontal line duration is accomplished through use of a modified time base correction. Line rate conversion is accomplished with a simple interpolation scheme which uses coefficients derived from an approximation of the desired conversion ratio, e.g. 5/6 instead of 525/625. No expensive frame stores are used since the magnetic tape itself is used as a record or store.

DETAILED DESCRIPTION

Figure 1:
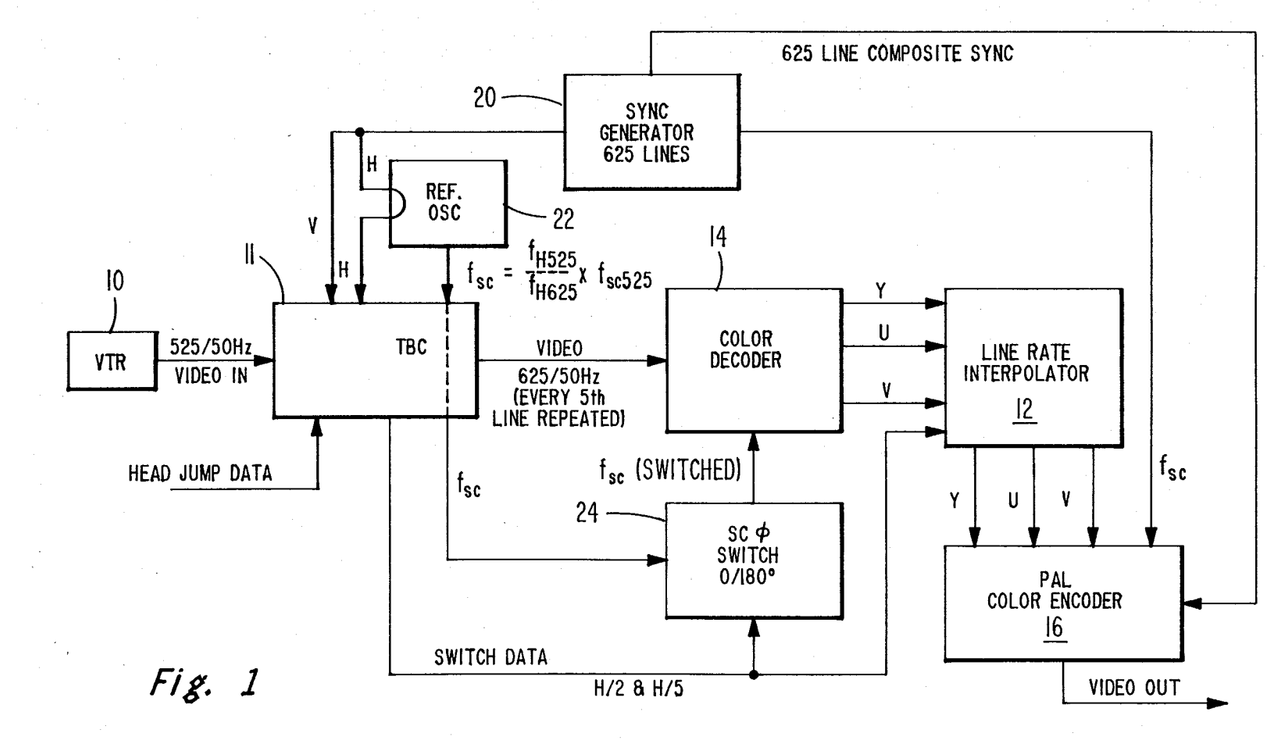
FIG. 1 shows a block diagram of an embodiment of the invention for converting NTSC to PAL.

A block diagram of a television signal standards conversion system with the invention incorporated therein is shown in FIG. 1. As an example of operation, a 525-line, 60 frame-per-second (Hz) recorded NTSC television signal is replayed as a 625-line, 50 Hz frame rate PAL television signal by this system. A video tape replay apparatus (VTR) 10 accomplishes the frame rate conversion by reducing the headwheel rotation rate to 50 Hz and produces a television signal having the recorded 525 lines rate but converted to a 50-Hz frame rate. Thus the horizontal line duration is approximately $$(V_{525} \times T_{H525})/V_{625} = 76.25 \ \mu s$$

in this signal, wherein $V_{525}$ and $V_{625}$ are the vertical frequencies for the 525 (NTSC) and 626 (PAL) line systems respectively and $T_{H525}$ is the line period of the 525 (NTSC) system, which is about 63.55 $\mu s$. Signals from the modified VTR 10, PAL sync generator 20, and reference oscillator 22 are applied to a time base corrector (TBC) 11. Sync generator 20 supplies horizontal and vertical sync information to TBC 11, and horizontal sync is also used to lock reference oscillator 22, which oscillator supplies a modified subcarrier frequency $$F_{SC} = F_{H525}/F_{H625} \times F_{SC525},$$

wherein $f_{H525}$ and $f_{H625}$ are the horizontal frequencies for the 525 and 625 line systems respectively and $f_{SC525}$ is the chroma subcarrier frequency for the 525-line system. TBC 11 digitizes video data at a rate of four times the subcarrier of the incoming signal from VTR 10 and writes this data into its memory (not shown). The data is read from this memory at a rate of four times the frequency provided by reference oscillator 22, which oscillator is locked to the 625-lines horizontal frequency standard. The output signal from TBC 11 comprises 625 lines-per-frame, 50 Hz frame rate video, wherein each television line is of proper duration, the 625 lines being obtained by repeating every fifth line. This simplified line rate conversion process will cause a 2.5 line error per field, which is compensated for by changes in the duration of the vertical interval by inserting a new vertical interval. This output signal from TBC 11 is in turn applied to color decoder 14, which decoder 14 separates the signal into its component parts, such as Y, U and V. Because of the repetition of every fifth line, the subcarrier frequency does not follow its normal NTSC sequence of being inverted on altenate lines, since when a line is repeated, its subcarrier phase does not change. Therefore, in order to properly decode this signal, the phase of the subcarrier reference supplied to decoder 14 must be inverted each time that a line repetition occurs. This is accomplished by subcarrier phase switch 24, which provides 0° and 180° subcarrier phases in response to its input control signal from TBC 11.

The component signal outputs from decoder 14 are then applied to a line rate converter or interpolator 12 which produces component television signals having the desired 625-line rate and 50 Hz frame rate but having interpolated lines, which interpolation eliminates artifacts caused by simply repeating every fifth line. Finally, color encoder 16 derives a television signal in full accordance with the desired PAL standard. Note that color encoder 16 could also be a SECAM encoder, should conversion from NTSC to SECAM be desired. This invention relates to the VTR 10 and to the line rate interpolator 12 in the standards conversion system of FIG. 1, while component decoder 14 and color encoder 16 therein are well known in the prior art. Furthermore, this system or any portions thereof, could be either analog or digital.

Figure 2:
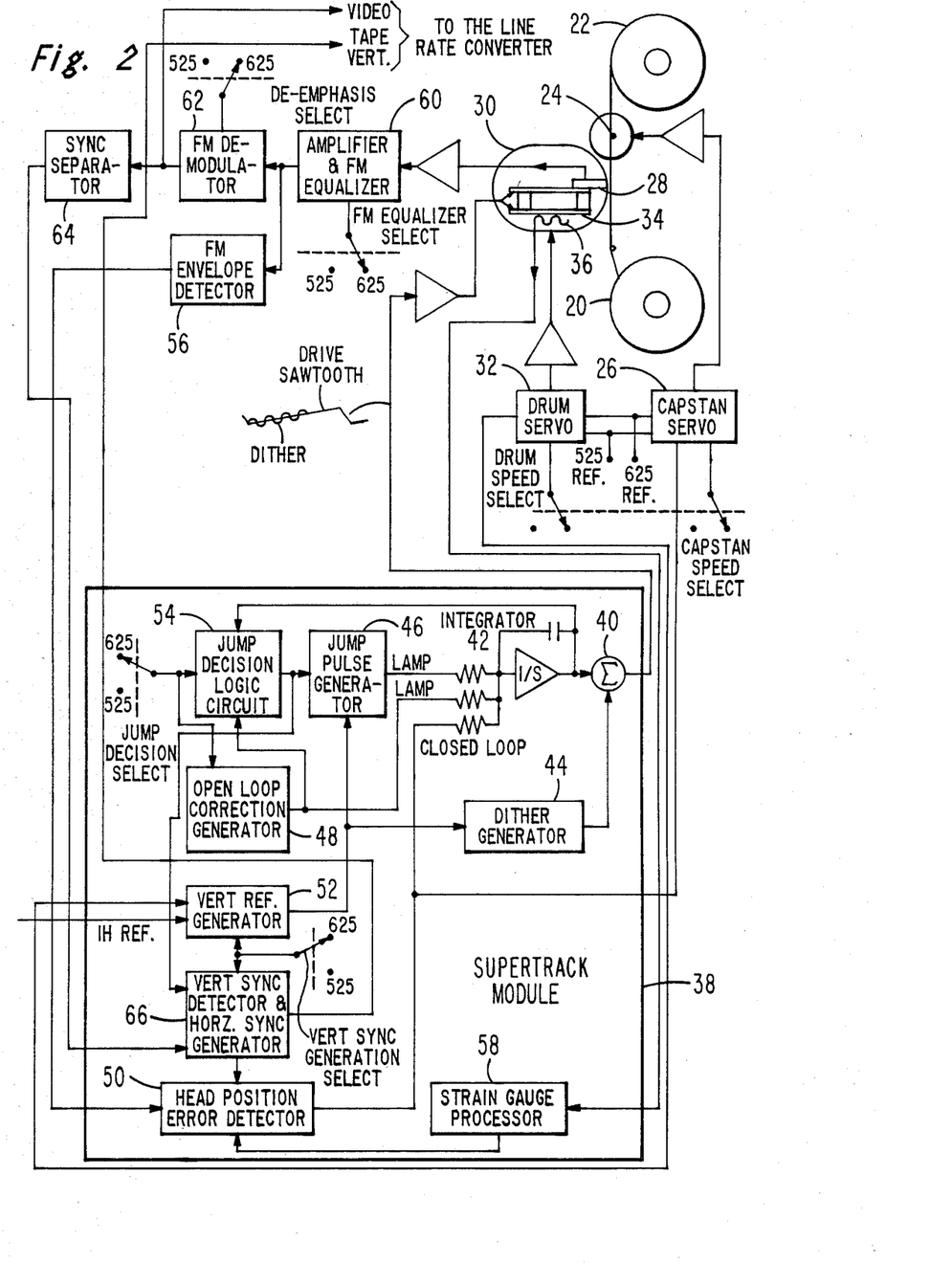
FIG. 2 shows a block diagram of a modified video tape recorder used in FIG. 1.

Although any VTR unit could be used within the scope of this invention, the details of the required modification will only be described in regard to a model TR-800 type-C helical-scan VTR which is commercially available from the RCA Corporation. The TR-800 model is capable of both recording and replaying television signals that comply with either the NTSC (525 lines/60 frames) or PAL (625 lines/50 frames) standards at any one time. As illustrated in FIG. 2, the TR-800 model VTR conventionally includes a tape transport system in which the tape travels between supply and take-up reels 20 and 22 respectively, at a velocity determined by a capstan 24 in a tape drive system that is controlled by a capstan servo 26. The tape is helically scanned as it moves by a video head 28 disposed on a rotating drum or scanner 30 that is controlled by a drum servo 32. The video head 28 is affixed to a bimorph element 34 having a strain gauge 36 disposed thereon to monitor its deflection. An automatic tracking or SUPERTRACK module 38 controls the deflection characteristics of the bimorph element 34 to scan only complete tape tracks with the video head 28 during non-tracking replay modes of operation, such as moviola mode. Such an automatic tracking system is described in U.S. patent application Ser. Nos. 363,802, 363,805, and 363,810, all filed Mar. 31, 1982 and assigned to the assignee of the present invention. Normally, e.g., during tracking modes of replay, amplitude variations of the detected FM signal which occur within certain portions of the cycle of the dither signal indicates tracking error, and are in turn used by SUPERTRACK module 38 to control the nominal (average) position of bimorph element 34 to eliminate the tracking error.

Output signals from an integrator 42 and a dither generator 44 are summed at junction 40 within the SUPERTRACK module 38, and the output from summing junction 40 is applied to drive bimorph element 34. The combined outputs from a jump pulse generator 46, an open loop correction generator 48, and a head position error detector 50 are applied at the input of the integrator 42. Output from a vertical reference generator 52 is applied to both the dither generator 44 and the jump pulse generator 46 which is also driven with the output from a jump decision logic circuit 54 having the outputs from the integrator 42 and the open loop correction generator 48 applied thereto. The vertical reference generator 52 is driven by a pulse reference signal from the drum servo 32, while the head position error detector 50 is driven by outputs from a processor 58 for the output signal from the strain gauge 36 and from a FM envelope replay detector 56 disposed exterior to the SUPERTRACK module 38. During replay, the recorded television signal on the tape is directed to an amplifier and FM equalizer 60 by the video head 28. Output from the amplifier and FM equalizer 60 is applied to both the FM envelope detector 56 and a FM demodulator 62 which passes the replayed television signal to both a sync separator 64 and one video output terminal of the VTR. Outputs from the sync separator 64 and the jump decision logic circuit 54 are applied to a vertical sync detector and horizontal sync generator 66 which applies the horizontal sync generated thereby to the head position error detector 50 and passes the vertical sync signal to another output terminal of the TR 800 model VTR.

The modifications necessary to the TR 800 model VTR in providing for the frame rate conversion of this invention are quite simple when only NTSC and PAL signal standards are involved in the conversion. Assuming that a NTSC (525 line/60 Hz) television signal recorded on a tape is to be converted to a PAL (625 line/50 Hz) television signal, the tape would be replayed in the TR 800 model VTR with the capstan servo 26 set to operate in accordance with NTSC television signal standards, i.e. at 30 frames per second, while the remaining servo elements in the TR 800 model VTR are set to operate in accordance with PAL television standards. Therefore, the tape will be replayed at the correct velocity for the recorded NTSC information thereon but it will be scanned by the video head 28 at the reduced PAL field rate (50 Hz), so that all signal frequencies replayed therefrom will be reduced by 16.67 percent. Furthermore, due to the lower scanning rate, one out of every six scans or tape tracks must be skipped, while the SUPERTRACK module 38 otherwise maintains head tracking during all scans. In accomplishing this, logic circuit 54 sets jump rate generator 46 to skip a scan when necessary. Feedback from the output of integrator 42 to the logic circuit 54 automatically compensates for the true NTSC field rate being only 59.94 Hz rather than 60 Hz. The open loop correction generator 48 applies head to tape reference speed information to the integrator 42 and thereby compensates for basic scanning error to reduce the required range and gain of the closed loop error correction provided through the head position error detector 50. The vertical sync detector and sync generator 66 characteristics are adjusted to compensate for higher line duration which results from the lower scanning rate. The reduced signal frequencies replayed from the tape are frequency equalized when passed through the amplifier and FM equalizer 60, while compensation is provided by the FM demodulator 62 for the change in the FM deviation and de-emphasis characteristics which result due to these reduced signal frequencies.

Figure 3:
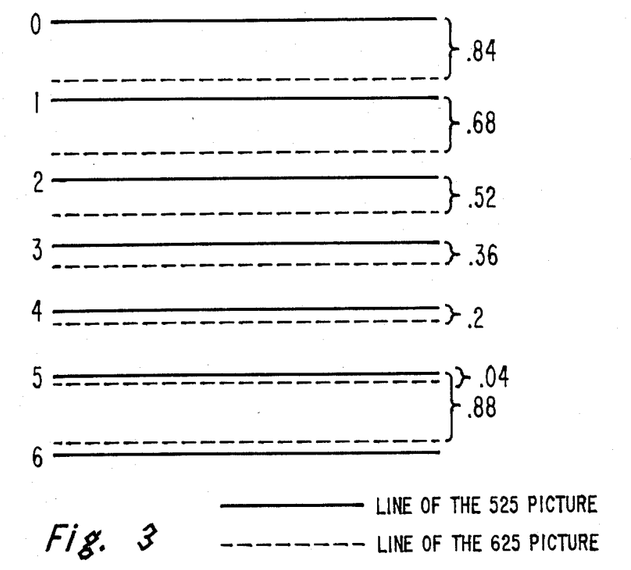
FIGS. 3 and 4 show diagrams useful in explaining the line rate conversion of the invention.

Although other embodiments of the line rate and line length conversion unit 12 in FIG. 1 are possible, only two embodiments will be disclosed herein. In these embodiments, the line rate conversion to either increase or decrease the number of raster scan lines in synthesizing a new raster format having the desired number of scan lines is accomplished by a simplistic scheme for interpolating new raster scan lines at locations between the available raster scan lines. As shown in FIG. 3, the conventional approach for converting from NTSC (525 lines per raster) to PAL (625 lines per raster), is to synthesize the new raster format by interpolating new raster scan lines located by spacing steps of 0.84 (525/625) times the spacing between the available raster scan lines. Such an approach synthesizes 25 new raster scan lines before the 21st available raster scan line is usable without interpolation. Therefore, assuming that linear interpolation requiring only a single coefficient is utilized, 25 coefficient tables must be stored in memory (each coefficient table comprising 256 entries, so that each table entry is the input multiplied by the coefficient), or 25 coefficients must be stored and used with an expensive and power-consuming digital multiplier, to perform the necessary interpolations for synthesizing the new rasters.

Figure 4:
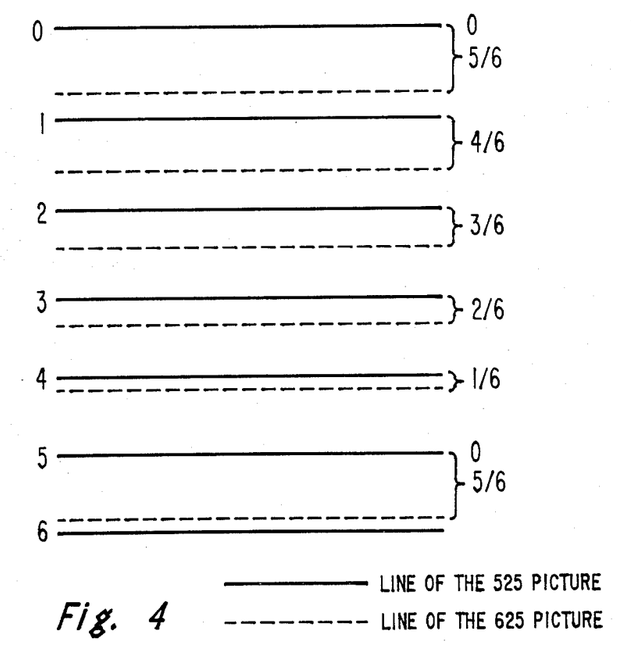

The simplistic interpolation scheme of this invention only requires that four coefficients be stored in memory and it utilizes every fifth available raster scan line without interpolation, as shown in FIG. 4. A 5/6 conversion ratio is utilized for the NTSC to PAL conversion and therefore, the sequence of coefficients reduces to 0, 5/6, 4/6, 3/6, 2/6 and 1/6 for the linear interpolation to be accomplished. Using linear interpolation, the value of each pixel on a new raster scan line is synthesized from the values of corresponding pixels on the available raster scan lines located above and below the new raster scan line in accordance with the following equation:

$L'(n) = [L_b(n) - L_a(n)]\Delta n + L_a(n)$, wherein $L'(n)$ is a pixel on the new raster scan line, $L_a(n)$ and $L_b(n)$ are pixels on the available raster scan lines located above and below $L'(n)$ on the new raster scan line and $\Delta n$ is the difference in location between the new raster scan line and the available raster scan line located thereabove. This equation says that the value of the new pixel is established by proportioning the difference between upper and lower pixels according to the position of the new pixel therebetween, and adding the proportional difference to the value of the upper pixel.

Figure 5:
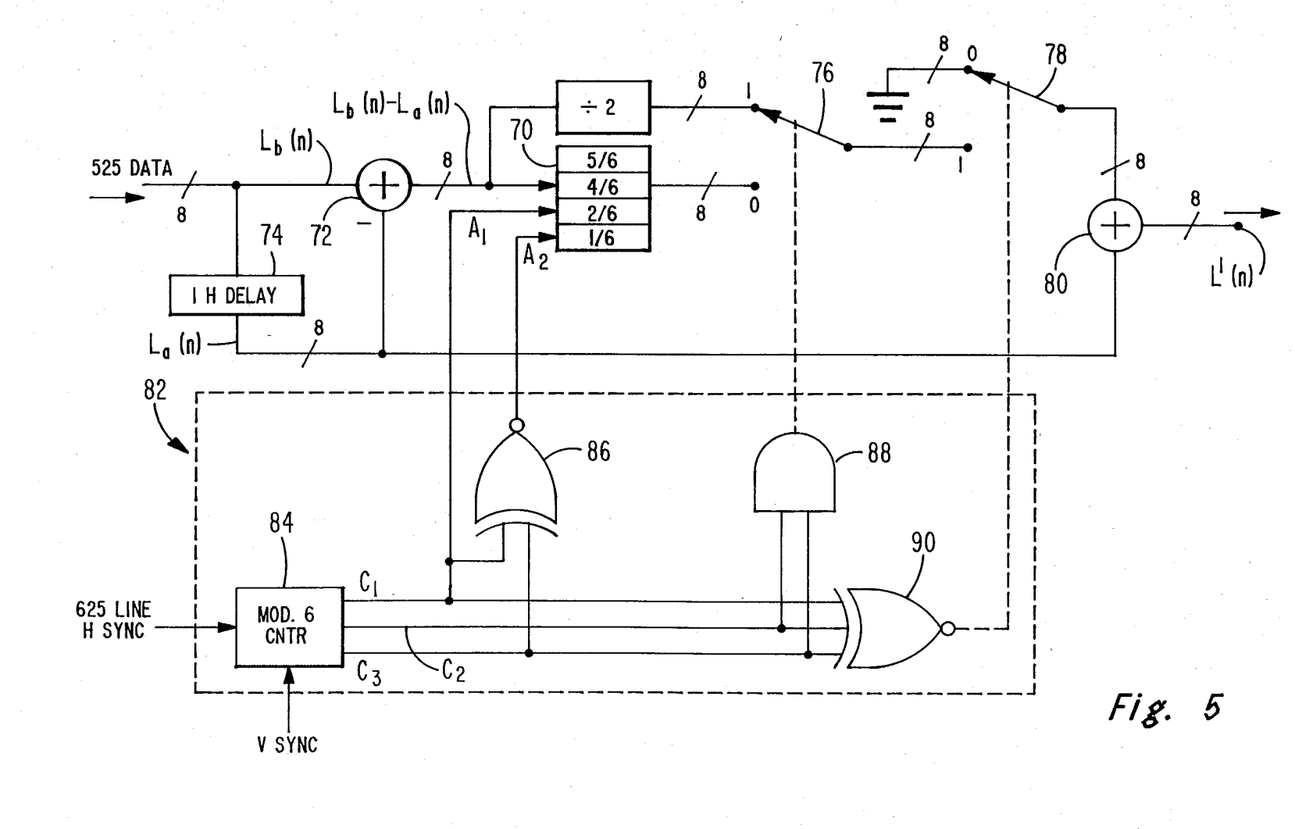
FIG. 5 is a circuit diagram of a first embodiment of a line rate converter used in FIG. 1.

One preferred circuit arrangement for deriving the new raster format in accordance with this equation is illustrated in FIG. 5 and the coefficients 0 and $\frac{1}{2}$ (3/6) are derived without memory storage in this arrangement. A ROM 70 (such as a 1024×8) is disposed in this arrangement to store the four remaining coefficient tables and provide at its output the product of its input and one of its stored coefficients. This is accomplished by conceptually dividing ROM 70 into four pages, each 256×8. An 8-bit signal input from subtractor 72 addresses one memory location in each of the four pages. The particular page selected to produce an output signal is determined by two (2) binary inputs $A_1$ and $A_2$. Depending upon the state of the $A_1$ and $A_2$ inputs, each 8-bit video input to ROM 70 produces an output from a corresponding address of the selected page. The ROM is preprogrammed so that the contents of each memory location equals the 8-bit address adjusted by the corresponding multiplication factor. For example, when the 8-bit input signal is 1011010 corresponding to a quantizing level value of 90, and inputs $A_1$ and $A_2$ select the memory page corresponding to multiplication by 2/6, the memory location at that page has stored the digital value 0011110 corresponding to decimal 30. The memory locations addressed in the pages for multiplication by 5/6, 4/6 and 1/6 contain at location 1011010 the decimal values 75, 60 and 15, respectively. The available raster scan line information $L_b(n)$ in a selected bit format (8 bit format for purposes of discussion only) is applied directly to the first 8-bit input of an 8-bit subtractor 72 and through 8-bit 1H (horizontal line) delay 74 to the second 8-bit input therof as the available raster scan line information $L_a(n)$. Output from the subtractor 72 is applied as $L_b(n) - L_a(n)$ to the input of the ROM 70 and as $\frac{1}{2}(L_b(n) - L_a(n))$ to the binary 1 throw terminal of an eight-pole double-throw switch 76 for the selected bit format. As is obvious to all skilled in the art, the divide by two function shown in FIG. 5 could be accomplished by applying data to switch 76 which consists of a 0 in the most significant bit position in addition to bit outputs from subtractor 72 to complete the selected bit format, thus implementing division by 2 as a "hard-wired" right shift. Output from the ROM 70 is applied to the binary 0 throw terminal of switch 76 which has its outputs applied to the binary 1 throw terminal of an eight-pole double-throw switch 78 for the selected bit format. Ground (binary zero) is applied to the binary 0 throw terminal of switch 78 which has its outputs applied to the first input of an 8-bit adder 80. Available raster scan line information $L_a(n)$ from the 1H delay 74 is applied to the second input of adder 80 which provides the new raster scan information $L'(n)$ at its output terminal.

A logic network 82 clocked by the horizontal sync signal and reset by the vertical sync signal of the new raster format, controls the ROM 70 and switches 76 and 78. For the raster format conversion from 525 to 625 lines, the 625 line horizontal sync signal is applied to the logic network 82 at the input of a modulo 6 counter 84. The output is taken in a three bit ($C_1$, $C_2$, $C_3$) binary format from counter 84. Because the ROM 70 is partitioned for only 4 coefficient products, it requires only two binary address inputs $A_1$ and $A_2$. Output MSB (most significant bit) C1 from counter 84 is applied to address input $A_1$ of the ROM 70, while output bits $C_1$ and $C_3$ are individually applied to the inputs of an exclusive NOR gate 86 which has its output applied to address input $A_2$. Output bits $C_2$ and $C_3$ ($C_3$ being the LSB, least significant bit) from counter 84 are individually applied to the inputs of an AND gate 88 which has its output applied to control switch 76. Output bits $C_1$, $C_2$, and $C_3$ from the counter 84 are individually applied to the inputs of an exclusive NOR gate 90 which has its output applied to control switch 78.

Figure 6:
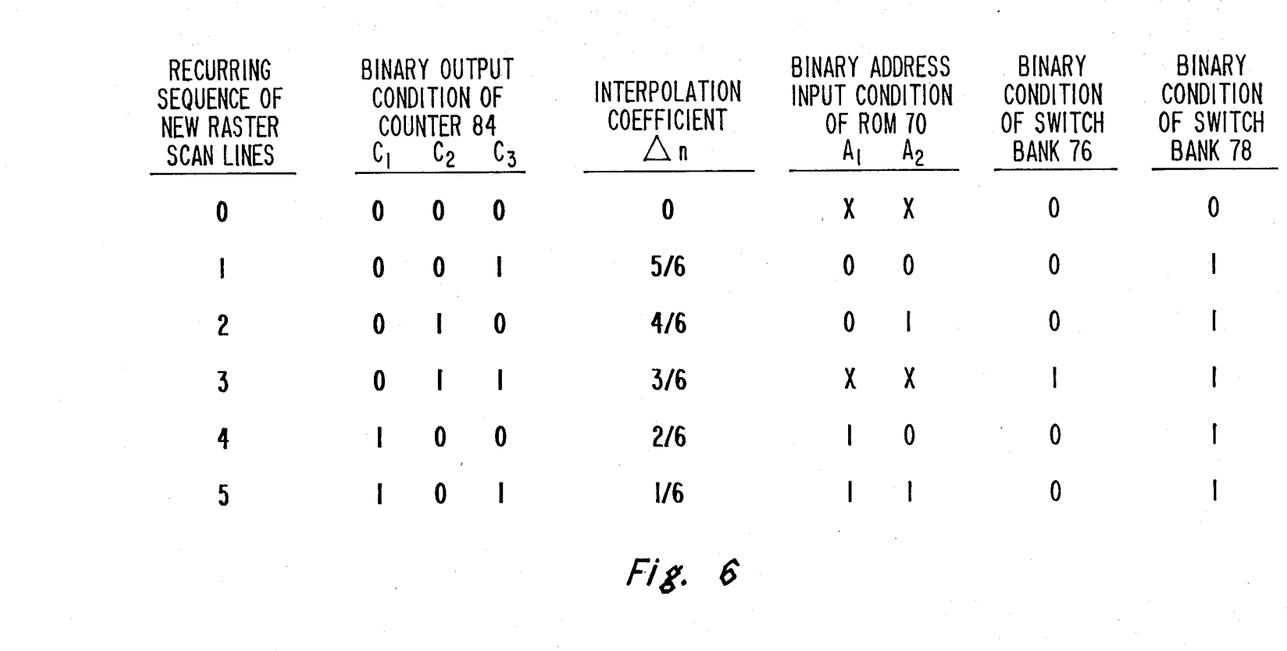
FIG. 6 shows logic states of components of FIG. 5.

Operation of the FIG. 5 circuit arrangement is illustrated in FIG. 6 where the binary output condition of counter 84, the interpolation coefficient $\Delta n$, the binary address input condition of ROM 70, the binary condition of switch 76 and the binary condition of switch 78 are diagrammed for the recurring interpolation sequence of 6 new raster scan lines. Because switch 76 is in its binary 1 condition for each new raster scan line 3 and switch 78 is in its binary 0 condition for each new raster scan line 0, the binary address input conditions of ROM 70 are indicated as "X" because they do not affect the interpolations performed to derive these new raster scan lines. For each of the other new raster scan lines 1, 2, 4 and 5, switches 76 and 78 are in their binary 0 and 1 conditions respectively, and each different binary address input condition of ROM 70 does affect the interpolations performed by directing a different coefficient product output from ROM 70 to the adder 80. For the circuit of FIG. 5, the $A_1$ and $A_2$ address bits divide the 1024×8 ROM 70 into 4 segments of 256×8, which when addressed by the remaining 8 address bits provide the desired coefficient product output.

Operation of the interpolation circuit of FIG. 5 in conjunction with the standards conversion system can be understood by examining a sequence of operations. Recall that the input to this circuit in the case of NTSC to PAL conversion is a 625 line raster, where every fifth line has been repeated to form the 625 lines, as shown in FIG. 4. Note that for output line $L'(n) =$ line 1, input lines are $L_b(n) =$ line 1 and $L_a(n) =$ line 0, while the interpolation coefficient $\Delta n$ is 5/6. Thus output $L'(n) =$ line 1 is interpolated from input lines 1 and 0 of the original 525 line picture by adding to incoming line $L_a(n) =$ line 1 a value of 5/6 of the difference between lines $L_a(n) = 1$ and $L_a(n) = 2$. Similarly, for output line $L'(n) =$ line 2, the input lines are $L_b(n) =$ line 2 and $L_a(n) =$ line 1, while $\Delta n = 4/6$; thus $L'(n) =$ line 2 is interpolated from lines 1 and 2 of the original 525 line picture. This pattern continues up to and including output line $L'(n) = 5$. For output line $L'(n) =$ line 6, however, $L_a(n) =$ line 5, $L_b(n) =$ line 5, since line 5 of the original 525 line picture has been repeated. In addition, $\Delta n = 0$, so the output line L'(n)=line 6 is identical to input line 5. Thus, over a recurring sequence of 6 output lines, we find that 5 have been interpolated from lines of the 525 line picture, while the sixth output line is identical to the fifth line of the original 525 line picture. This operation creates six fully interpolated lines from five input lines and another repeated input line, without the use of a memory larger than 1H.

Figure 7:
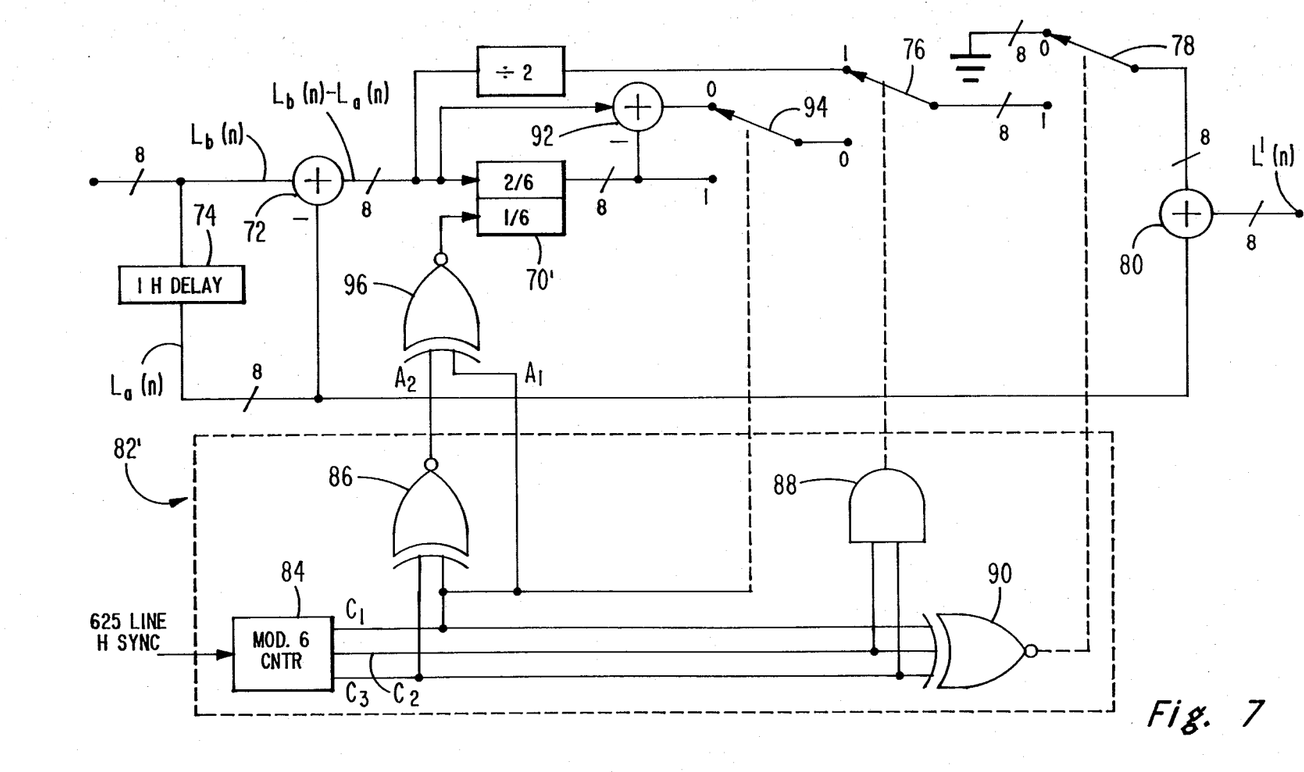
FIG. 7 shows a block diagram of a second embodiment of a line rate converter.

Arrangements other than that illustrated in FIG. 5 could be utilized to perform the linear interpolation necessary for the 5/6 conversion ratio in the concept of this invention. For instance, ROM space could be reduced by a factor of two by taking advantage of the fact that $5/6x = x - 1/6x$ and $4/6x = x - 2/6x$ so that only coefficient products of 1/6 and 2/6 need be stored in ROM 70. As shown in FIG. 7 for such an arrangement, an 8-bit subtractor 92 and another eight-pole double-throw switch 94 for the selected bit format would be added to modify the circuit of FIG. 5. Control signal $A_1$ (which is the same as $C_1$) would control the position of switch 94, selecting in its binary 1 throw position the output of ROM 70' (for coefficient products of 1/6 and 2/6), and selecting in its binary 0 throw position the output of subtractor 92, to which both the input and output of ROM 70' (for coefficient products of 5/6 and 4/6) are applied. Also, signals $A_1$ and $A_2$ are exclusive NORed by gate 96 to provide the most significant address bit to ROM 70', so that coefficient product output occur in the sequence of 1/6, 2/6, 2/6, 1/6. This, in conjunction with the switch position sequence X, 0, 0, X, 1, 1 of switch 94 produces a coefficient sequence of 5/6, 4/6, 2/6, 1/6, as does ROM 70 in FIG. 5.

Figure 8:
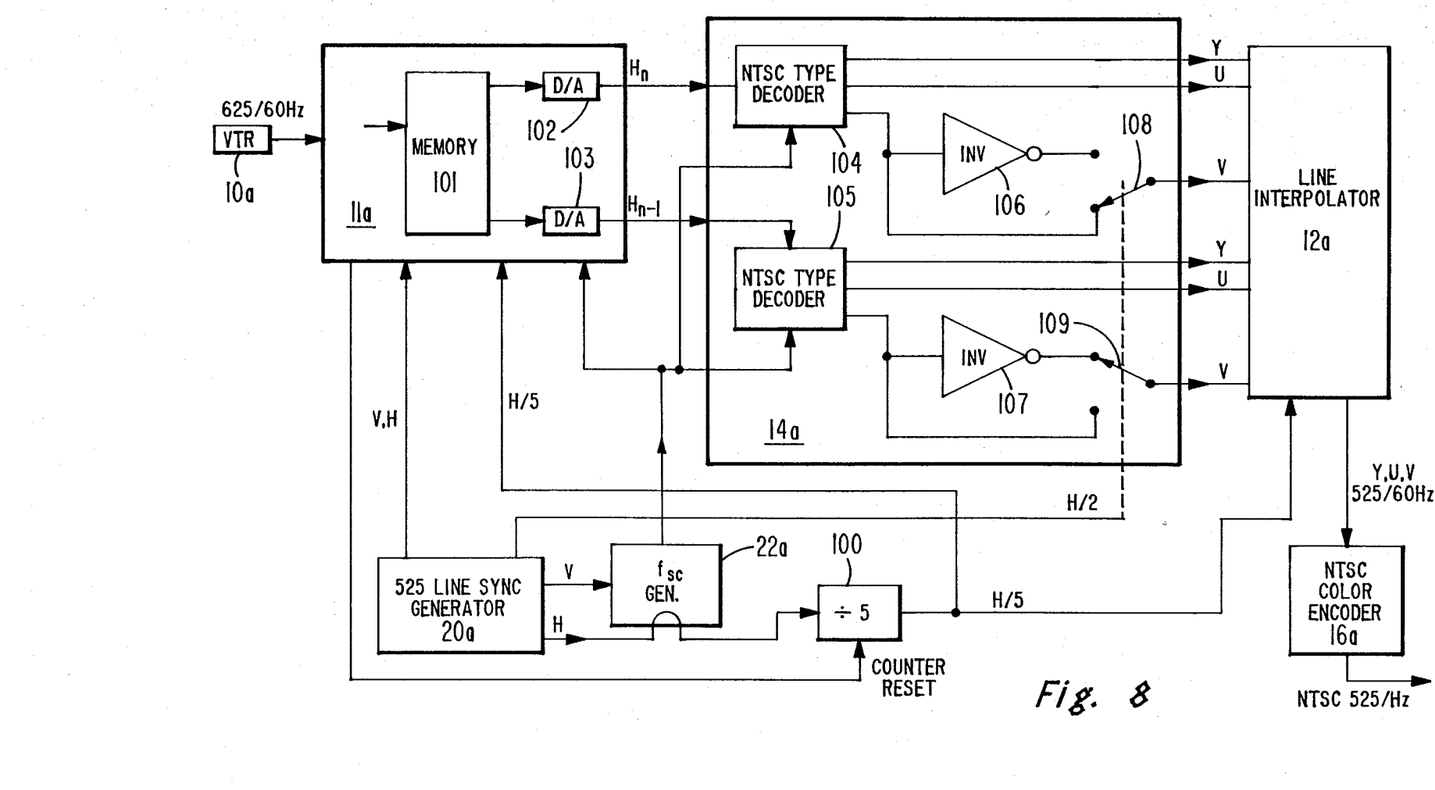
FIG. 8 shows a block diagram of an embodiment of the invention for converting PAL to NTSC.

FIG. 8 shows a block diagram of a PAL to NTSC converter, wherein elements that correspond to FIG. 1 are designated by the same reference numeral with suffix "a". VTR 10a reproduces signals from a tape (not shown) recorded using PAL standards. The tape capstan speed is that normally used for PAL signals, but the playback head drum is rotating at a speed in accordance with NTSC signals. Thus the output signal from VTR 10a has 625 lines-per-frame, but 60 Hz field rate and is applied to TBC 11a. The line duration of this signal is approximately $$V_{625}/V_{525} \times T_{H625} = 53.33 \; \mu\text{sec}.$$

In TBC 11a, the input signal is written into memory 101 using a write clock that is locked to the color subcarrier of the incoming tape signal to remove jitter. This subcarrier is thus derived from the incoming signal, and the exact expression for the write clock is $$4 \times V_{525}/V_{625} \times F_{SC625}.$$

The data is read out at a frequency of $$4 \times F_{H525}/F_{H625} \times f_{SC625},$$

which is locked to vertical and horizontal signals from NTSC sync generator 20a. The frequency $$F_{H525}/F_{H625} \times f_{SC625}$$

is supplied by $f_{sc}$ generator 22a. Thus the read out frequency is locked to the vertical and horizontal rate signals of the NTSC standard through a 30 Hz offset, due to the 25 Hz offset of the PAL subcarrier frequency.

In the case of conversion from PAL to NTSC, 625 lines must be reduced to 525 lines. If this is done simply by deleting entire scan lines, an artifact will result, despite the interpolation, because all of the lines of the 625 line picture must be available to the interpolator in order to properly interpolate to 525 lines. In a 6-line to 5-line conversion sequence, output line 1 is identical to input line 1, while output line 2 is interpolated from input lines 2 and 3, output line 3 is interpolated from input lines 3 and 4, output line 4 is interpolated from input lines 4 and 5 and output line 5 is interpolated from input lines 5 and 6. However, in the next pattern, output line 6 is identical to input line 7. Thus in computing the 5 line output sequence, 6 input lines are used, but the first and last are only used once. To accomodate this pattern of required input lines, the TBC is modified so that two lines are read from memory 101 and provided simultaneously by digital-to-analog converters 102 and 103. The output signals are each demodulated by an NTSC type decoder 104 or 105 (since the PAL subcarrier sequence is not fully maintained) and the swinging V color component of PAL is removed by switching at an H/2 rate by switch 108 or 109 an inverted V signal from inverter 106 or 107 or non-inverted V signal from decoder 104 or 105. Reset of switches 106 and 107 is done by an H/5 rate signal from frequency divider 100 to account for "skipped" lines in each channel. The color decoded Y, U and V signals from two adjacent lines are thus supplied to line interpolator 12a at the $L_a(n)$ and $L_b(n)$ inputs of the respective interpolators. Thus in the PAL to NTSC conversion, a modified TBC with two outputs is required, as are two color decoding circuits, but the 1H delays of the line interpolators are avoided. Then the signal is applied to NTSC color encoder 16a.

What we claim is:

1. A television standards conversion apparatus for changing the line and frame rates of a recorded NTSC television signal to the line and frame rates of a PAL signal standard comprising:
   a helical-scan video tape playback apparatus having a capstan which establishes the velocity at which the tape travels and at least one video head disposed on a headwheel which rotates at a velocity to scan the video heads at an angle across the direction of tape travel;
   control means for establishing the speed of said capstan in accordance with said NTSC television signal and for establishing the speed of said headwheel in accordance with said PAL signal standard to thereby convert the NTSC frame rate of the recorded television signal to said PAL standard; and
   line rate interpolation means for converting the line rate derived from the recorded NTSC television signal to the PAL standard which interpolation means uses coefficients predicated on simple fractional values which have a single digit numerator and a single digit denominator and establish a conversion ratio of 5/6.

2. The television signal conversion system of claim 1 wherein said line rate interpolation means includes:
   a subtractor having the replayed video signal from said recorder applied to a first input thereof;
   a one line delay having the replayed video signal from said recorder applied to the input thereof and the output thereof applied to a second input of said subtractor;

a ROM having the coefficients of interpolation stored therein and being addressable to provide the product of its input and one stored coefficient at its output, the output from said subtractor being applied to the input of said ROM;

a divide by 2 unit having the output from said subtractor applied to the input thereof;

a first single pole, double throw switch having binary 0 and binary 1 throw terminals and a single terminal output, the input from said divide by 2 unit being applied to said binary 1 throw terminal and the output from said ROM being applied to said binary 0 throw terminal;

a second single pole, double throw switch having binary 0 and binary 1 throw terminals and a single terminal output, said single terminal output from said first switch being applied to said binary 1 throw terminal thereof and ground being applied to said binary 0 throw terminal thereof;

an adder having the single terminal output from said second switch applied to a first input thereof and the output from said one line delay applied to a second input thereof; and a logic network for addressing said ROM and controlling said first and second switches to produce a video signal having the desired line rate at the output of said adder.

* * * * *